Patented Jan. 12, 1954

2,666,072

UNITED STATES PATENT OFFICE 2,666,072

HALOGENATION AND OXIDATION OF STEROIDS

Arthur R. Hanze and Robert H. Levin, Kalamazoo Township, Kalamazoo County, Mich., assignors to The Upjohn Company, Kalamazoo, Mich., a corporation of Michigan No Drawing. Application August 13, 1952,
Serial No. 304,224

14 Claims. (Cl. 260—397.4)

The present invention relates to a novel process for the preparation of certain steroid compounds and is more particularly concerned with a process for the production of 4-halo-3-ketosteroids from three-hydroxysteroids. Of particular interest is the production of 4-halo-21-acyloxy - 17 - hydroxypregnane - 3,11,20 - triones by the concurrent oxidation and halogenation of 21 - acyloxy - 3,17 - dihydroxypregnane - 11,20-diones.

The present invention is a continuation-in-part of our copending application, Serial No. 249,616, filed October 3, 1951, now abandoned.

It is an object of the present invention to provide a novel process for the oxidation and halogenation of three-hydroxy-steroids to 4-halo-3-ketosteroids. It is a further object of the present invention to provide a novel process for the oxidation and halogenation of 21-acyloxy-3,17-dihydroxypregnane-11,20-diones to produce 4-halo - 21 - acyloxy - 17 - hydroxypregnane-3,11,20-triones. Other objects of the invention will be apparent to those skilled in the art to which this invention pertains.

According to the method of the present invention a three-hydroxysteroid such as a 21-acyloxy - 3,17 - dihydroxypregnane - 11,20-dione is reacted with a hypohalous acid to cause conversion of the hydroxyl group at carbon atom three of the steroid nucleus to a ketone group and to cause halogenation at carbon atom four of the steroid nucleus in a single-step procedure.

The preferred starting compounds of particular interest for the method of the present invention are 21 - acyloxy - 3,17 - dihydroxypregnane-11,20-diones. In these compounds the acyloxy group contains from one to eight carbon atoms, inclusive, such acyloxy groups including, for example, formoxy, acetoxy, propionoxy, butanoyloxy, isobutanoyloxy, valeroyloxy, hexanoyloxy, heptanoyloxy, octanoyloxy, and the like. The starting 21-acyloxy compounds are prepared by replacement of the 21-bromine atom in 21-bromo-3,17-dihydroxypregnane-11,20-dione using the selected organic acid sodium salt or by acylation of the corresponding 21-hydroxy compound. For purposes of the process of the present invention the acyloxy groups of the starting materials may carry non-reactive substituents, such as halo, alkoxy, alkyl, or the like if desired.

The process of the present invention is advantageous and useful in that the 4-halo-3-ketosteroids produced are readily dehydrohalogenated, as is well-known in the art, to produce $\Delta^4$-3-ketosteroids. The $\Delta^4$-3-ketosteroids are important and useful since the $\Delta^4$-3-keto grouping is present in most physiologically active steroid hormones, such as, for example, the adrenal cortical hormone, cortisone acetate. As a further illustration of the utility of this invention, 4-bromo - 17$\alpha$ - hydroxy - 21 - acetoxypregnane-3,11,20-trione, a compound produced by the process of the present invention, may be dehydrohalogenated with pyridine to produce cortisone acetate. Other uses and advantages of this invention will be apparent to those skilled in the art.

The oxidizing-halogenating agents used in the process of the present invention are the hypohalous acids, preferably selected from the group consisting of hypobromous acid and hypochlorous acid, i. e., hypohalous acids wherein the atomic weight of the halogen atom present is between 34 and 81. These reagents have been found to possess the capacity of effecting concurrent oxidation of the three-hydroxy group and halogenation of the four position of the nucleus of the starting materials.

While the theoretical amount of hypohalous acid for the process of the present invention is two moles to one mole of starting steroid, it is preferred to use an excess, e. g., from about two to five moles of acid per mole of steroid, although even higher molar ratios may be used if desired. Less than the theoretical amount of acid may also be used, but it is of course to be understood that lower yields and conversions are obtained in such procedure.

Tertiary butyl alcohol is the preferred solvent, but other solvents which are non-reactive under the conditions of reaction, such as dioxane, tertiary alkanols, and the like, may be used if desired, and the selection of a suitable solvent will be apparent to one skilled in the art.

In carrying out the process of the present invention, one molar part of three-hydroxysteroid such as, for example, a 21-acyloxy-3,17-dihydroxypregnane-11,20-dione is admixed, using either order of addition, with at least the theoretical amount of the hypohalous acid in the presence of an organic solvent which is non-reactive with the reactants and reaction products under the conditions of reaction, at a temperature below about fifty degrees centigrade, preferably between about fifteen and forty degrees centigrade. Pyridine and other acid-binding agents should not be employed as solvents, nor should substantial amounts of other basic reagents such as potassium acetate or the like be added to or be present in the reaction mixture, as the presence of such reagent impedes, hinders, or prevents the halogenation step of the reaction.

The length of the reaction period is not critical, depending somewhat upon the starting materials and the reaction conditions employed, and in this respect varying somewhat inversely with the temperature employed. Reaction periods of between one and ten days have been found satisfactory, for example, using room temperature. At the end of the reaction period, the desired product is usually separated from the mixture of reaction products as a crystalline solid, washed with solvent and dried to give the more highly purified crystalline material. Additional material may be obtained by adding water to the filtrate of the reaction mixture.

The yield of desired reaction product is usually between about forty and about sixty-five percent, the higher yields being consistently obtained by application of the optimum reaction conditions. The presence of water in an amount of between traces to eighteen percent of the volume of solvent is advantageous. With no water present the reaction proceeds comparatively sluggishly, while with considerable water present the same result is observed. However, with about one to eighteen percent of water, preferably from about one to five percent of water the reaction both proceeds rapidly and gives high yields of desired product. Addition to the reaction mixture of an acid such as hydrobromic acid or sulfuric acid increases the speed of reaction.

The following examples are illustrative of the present invention but are not to be construed as limiting.

*Example 1.—4-bromo-21-acetoxy-17α-hydroxypregnane-3,11,20-trione*

To one gram (2.46 millimoles) of 21-acetoxy-3α,17α-dihydroxypregnane-11,20-dione [prepared from 3α,17α - dihydroxypregnane - 11,20 - dione (Sarett, J. Am. Chem. Soc., 70, 1454 (1948)) by bromination in the 21-position using bromine in chloroform at about room temperature and subsequent replacement of the 21-bromine atom by reaction with potassium acetate in refluxing acetone] in 39 milliliters of tertiary butyl alcohol was added 10.9 milliliters of water containing 6.15 millimoles of hypobromous acid. The mixture was allowed to stand for four days after which time the solid was filtered off and the filtrate concentrated to twenty milliliters. The concentrated filtrate was allowed to stand overnight. The resulting crystals were filtered off and added to the first crop. The yield was 59.2 percent of 4 - bromo - 21 - acetoxy - 17α - hydroxypregnane-3,11,20-trione, rotating at plus 100 degrees (acetone) at 24 degrees centigrade, and melting at about 198–204 degrees centigrade with decomposition.

*Example 2.—4-chloro-21-acetoxy-17α-hydroxypregnane-3,11,20-trione*

In the same manner as given in Example 1, 4 - chloro - 21 - acetoxy - 17α - hydroxypregnane-3,11,20-trione, melting at about 239–243 degrees centigrade, is prepared from 21-acetoxy-3α,17α-di-hydroxypregnane-11,20-dione, using hypochlorous acid instead of hypobromous acid.

*Example 3.—4-bromo-21-acetoxy-17α-hydroxypregnane-3,11,20-trione*

The starting 21-acetoxy-3β,17α-dihydroxypregnane-11,20-dione is prepared from pregnane-3,-11,20-trione [Reichstein and Fuchs, Helv. Chim. Acta., 26, 721 (1943)] in the following manner. Reduction of the pregnane-3,11,20-trione with Raney nickel catalyst in methanol gives 3β-hydroxypregnane-11,20-dione, which is then treated with acetic anhydride or other anhydride containing para-toluenesulfonic acid to form the 3β,20-diacetoxy-17(20)pregnane-11-one. Treatment of this latter compound with peracetic acid in chloroform followed by saponification with dilute alkali yields 3β,17α-dihydroxypregnane-11,20-dione. Bromination of this compound using bromine and chloroform at about room temperature is productive of bromination in the 21-position and subsequent replacement of the 21-bromine atom by reaction with potassium acetate in refluxing acetone gives the starting 3β,17α-dihydroxy-21-acetoxy or other acyloxypregnane-11,20-dione [Sarett, J. Am. Chem. Soc., 70, 1454 (1948)].

In the same manner as given in Example 1, 4 - bromo - 21 - acetoxy - 17α - hydroxypregnane-3,11,20-trione is prepared using the 21-acetoxy - 3β,17α - dihydroxypregnane - 11,20 - dione instead of the 21-acetoxy-3α,17α-dihydroxypregnane-11,20-dione.

Following the procedure of Example 1, other 4-bromo or 4-chloro-21-acyloxy-17α-hydroxypregnane-3,11,20-triones are prepared from the appropriate 21-acyloxy-3β,17α-dihydroxypregnane-11,20-dione and the requisite hypohalous acid.

*Example 4.—4-bromo-21-propionoxy-17α-hydroxypregnane-3,11,20-trione*

In the same manner as given in Example 1, 4 - bromo - 21 - propionoxy - 17α - hydroxypregnane-3,11,20-trione is prepared from 21-propionoxy - 3α,17α - dihydroxypregnane - 11,-20-dione and hypobromous acid.

In the manner of Examples 1 through 4, starting with the corresponding 21-acyloxy-3,17-dihydroxypregnane-11,20-dione, the following compounds are prepared: 4-bromo-21-formoxy-17-hydroxypregnane - 3,11,20 - trione; 4 - chloro - 21 - formoxy - 17 - hydroxypregnane - 3,11,20 - trione; 4-chloro-21-propionoxy-17-hydroxypregnane-3,11,20-trione; 4-bromo-21-butanoyloxy-17-hydroxypregnane-3,11,20-trione; 4-chloro-21-butanoyloxy-17-hydroxypregnane-3,11,20-trione; 4-bromo - 21 - valeroyloxy - 17 - hydroxypregnane - 3,11,20 - trione; 4 - chloro - 21 - valeroyloxy - 17 - hydroxypregnane - 3,11,20 - trione; 4 - bromo - 21 - hexanoyloxy - 17 - hydroxypregnane - 3,11,-20-trione; 4-chloro-21-hexanoyloxy-17-hydroxypregnane-3,11,20-trione; 4-bromo-21-heptanoyloxy-17-hydroxypregnane-3,11,20-trione; 4-chloro - 21 - heptanoyloxy - 17 - hydroxypregnane - 3,11,20 - trione; 4 - bromo - 2 - octanoyloxy - 17 - hydroxypregnane-3,11,20-trione; 4-chloro-21-octanoyloxy - 17 - hydroxypregnane - 3,11,20 -trione and the like.

*Example 5.—4-chloro-17α-hydroxypregnane-3,11,20-trione*

4 - chloro - 17α - hydroxypregnane - 3,11,20-trione, melting point 221 to 226 degrees centigrade, is obtained from 3α,17α-dihydroxypregnane-11,20-dione [Sarett, J. Am. Chem. Soc., 70, 1454 (1948)] and hypochlorous acid using the procedure of Example 1. In the same manner 4-chloro-17α-hydroxypregnane-3,11,20-trione is obtained from 3β,17α - dihydroxypregnane - 11,20-dione.

*Example 6.—4-chloropregnane-3,20-dione*

3α-hydroxypregnane-20-one is converted to 4-chloropregnane-3,20-dione, melting point 180–184 degrees centigrade, using hypochlorous acid according to the procedure of Example 1. 4-bromopregnane-3,20-dione is obtained using hypobromous acid.

*Example 7.—4-chloro-17α-hydroxy-21-bromopregnane-3,11,20-trione*

In the same manner as shown in Example 1, 3α,17α - dihydroxy - 21 - bromopregnane - 11,20-dione [Kritchevsky et al., J. Am. Chem. Soc., 74, 483 (1952)] is converted to 4-chloro-17α-hydroxy - 21 - bromopregnane - 3,11,20 - trione using hypochlorous acid.

In the same manner as shown in the above examples other three - hydroxysteroids are converted to 4-halo-3-ketosteroids including the following: coprostanol or epicoprostanol gives 4-chlorocoprostanone using hypochlorous acid and 4-bromocoprostanone using hypobromous acid; 3α (or β)-hydroxypregnane-11,20-dione gives 4-chloropregnane - 3,11,20 - trione using hypochlorous acid and 4-bromopregnane-3,11,20-trione using hypobromous acid; 3α,11α-dihydroxypregnane - 20 - one gives 4 - chloro - 11α - hydroxypregnane-3,20-dione using hypochlorous acid; 3α (or β)-hydroxy-17-isoetiocholanic acid gives 4-chloro-3-keto-17-isoetiocholanic acid using hypochlorous acid and the corresponding four-bromo compound using hypobromous acid; and other like examples.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the concurrent oxidation and halogenation of a 21 - acyloxy - 3,17 - dihydroxypregnane-11,20-dione to a 4-halo-21-acyloxy-17-hydroxypregnane - 3,11,20 - trione, which comprises: mixing a hypohalous acid selected from the group consisting of hypobromous acid and hypochlorous acid and a 21-acyloxy-3,17-dihydroxypregnane-11,20-dione, wherein the acyloxy group contains up to and including eight carbon atoms, in an organic solvent, which is non-reactive with the reactants and reaction products under the conditions of reaction, to cause conversion of the three-hydroxy group of the steroid nucleus to a three-keto group and to cause halogenation at carbon atom four of the steroid nucleus.

2. A process for the concurrent oxidation and halogenation of a 21 - acyloxy - 3,17 - dihydroxypregnane-11,20-dione to a 4-halo-21-acyloxy-17-hydroxypregnane - 3,11,20 - trione, which comprises: mixing, in a proportion of at least about one mole to one, a hypohalous acid selected from the group consisting of hypobromous acid and hypochlorous acid, and a 21-acyloxy-3,17-dihydroxypregnane-11,20-dione, wherein the acyloxy group contains up to and including eight carbon atoms, in an organic solvent which is non-reactive with the reactants and reaction products under the conditions of reaction, at a temperature below about fifty degrees centigrade, to cause conversion of the hydroxy group at carbon atom three of the steroid nucleus to a ketone group and to cause halogenation at carbon atom four of the steroid nucleus, and separating the 4-halo-21 - acyloxy - 17 - hydroxypregnane - 3,11,20-trione thus-produced.

3. A process which comprises: mixing, in a proportion of at least about one mole to one, a hypohalous acid selected from the group consisting of hypobromous acid and hypochlorous acid and a 21 - acyloxy - 17 - hydroxypregnane - 11,20-dione wherein the acyloxy group contains up to and including eight carbon atoms, in tertiary butyl alcohol containing up to about eighteen percent of water by volume, at a temperature between about fifteen and about forty degrees centigrade, to cause conversion of the three-hydroxy group of the steroid nucleus to a three-keto group and to cause halogenation at carbon atom four of the steroid nucleus, and separating the 4-halo-21 - acyloxy - 17 - hydroxypregnane - 3,11,20-trione thus-produced.

4. A process which comprises: mixing, in a proportion of at least one mole to one, hypobromous acid and 21-acetoxy-3α,17α-dihydroxypregnane-11,20-dione in an organic solvent which is non-reactive with the reactants and reaction products under the conditions of reaction, at a temperature below about fifty degrees centigrade, to cause conversion of the three-hydroxy group of the steroid nucleus to a three-keto group and to cause bromination at carbon atom four of the steroid nucleus, and separating the 4-bromo-21-acetoxy-17α - hydroxypregnane - 3,11,20 - trione thus-produced.

5. A process which comprises: mixing an excess of hypobromous acid and 21-acetoxy-3α,17α-dihydroxypregnane-11,20-dione in tertiary butyl alcohol solvent at a temperature between about fifteen and about forty degrees centigrade, to cause conversion of the three-hydroxy group of the steroid nucleus to a three-keto group and to cause bromination at carbon atom four of the steroid nucleus, and separating the 4-bromo-21-acetoxy-17-hydroxypregnane-3,11,20-trione thus-produced.

6. A process which comprises: mixing an excess of hypobromous acid and 21-acetoxy-3α,17α-dihydroxypregnane-11,20-dione in tertiary butyl alcohol solvent containing water in amount up to about eighteen percent of the solvent volume at a temperature between about fifteen degrees and forty degrees centigrade, to cause conversion of the three-hydroxy group of the steroid nucleus to a three-keto group and to cause bromination at carbon atom four of the steroid nucleus, and separating the 4-bromo-21-acetoxy-17α-hydroxypregnane-3,11,20-trione thus-produced.

7. A process which comprises: mixing an excess of hypochlorous acid and 21-acetoxy-3α,17α-dihydroxypregnane-11,20-dione in tertiary butyl alcohol solvent, at a temperature between about fifteen and about forty degrees centigrade, to cause conversion of the three-hydroxy group of the steroid nucleus to a three-keto group and to cause chlorination at carbon atom four of the steroid nucleus, and separating the 4-chloro-21-acetoxy - 17α - hydroxypregnane - 3,11,20 - trione thus-produced.

8. A process which comprises: mixing an excess of hypochlorous acid and 21-acetoxy-3α,17α-dihydroxypregnane-11,20-dione in tertiary butyl alcohol solvent containing water in amount up to about eighteen percent of the solvent volume at a temperature between about fifteen degrees and forty degrees centigrade, to cause conversion of the three-hydroxy group of the steroid nucleus to a three-keto group and to cause chlorination at carbon atom four of the steroid nucleus, and separating the 4-chloro-21-acetoxy-17α-hydroxypregnane-3,11,20-trione thus-produced.

9. A process for the concurrent oxidation and halogenation of a three-hydroxysteroid which comprises contacting a hypohalous acid with a three-hydroxysteroid.

10. A process for the concurrent oxidation and halogenation of a three-hydroxysteroid to a 4-halo-3-ketosteroid, which comprises: mixing a hypohalous acid and a three-hydroxysteroid, to cause conversion of the three-hydroxy group of the steroid nucleus to a three-keto group and to cause halogenation at carbon atom four of the steroid nucleus, and separating the 4-halo-3-ketosteroid thus-produced.

11. A process for the concurrent oxidation and halogenation of a three-hydroxysteroid to a 4-halo-3-ketosteroid, which comprises: mixing a hypohalous acid wherein the halogen atom has an atomic weight between 34 and 81 and a three-hydroxysteroid, in an organic solvent, which is non-reactive with the reactants and reaction products under the conditions of reaction, to cause conversion of the three-hydroxy group of the steroid nucleus to a three-keto group and to cause halogenation at carbon atom four of the steroid nucleus, and separating the 4-halo-3-ketosteroid thus-produced.

12. A process for the concurrent oxidation and halogenation of a three-hydroxysteroid to a 4-halo-3-ketosteroid, which comprises: mixing, in a proportion of at least about one mole to one, a hypohalous acid wherein the halogen atom has an atomic weight between 34 and 81, and a three-hydroxysteroid, in an organic solvent which is non-reactive with the reactants and reaction products under the conditions of reaction, at a temperature below about fifty degrees centigrade, to cause conversion of the three-hydroxy group of the steroid nucleus to a three-keto group and to cause halogenation at carbon atom four of the steroid nucleus, and separating the 4-halo-3-ketosteroid thus-produced.

13. A process for the concurrent oxidation and halogenation of a 21-acyloxy-3,17-dihydroxypregnane-11,20-dione which comprises: contacting a hypohalous acid with a 21-acyloxy-3,17-dihydroxypregnane-11,20-dione.

14. A process for the concurrent oxidation and halogenation of a 21-acyloxy-3,17-dihydroxypregnane-11,20-dione to a 4-halo-21-acyloxy-17-hydroxypregnane-3,11,20-trione, which comprises: mixing a hypohalous acid wherein the halogen atom has an atomic weight between 34 and 81 and a 21-acyloxy-3,17-dihydroxypregnane-11,20-dione, in an organic solvent, which is non-reactive with the reactants and reaction products under the conditions of reaction, to cause conversion of the three-hydroxy group of the steroid nucleus to a three-keto group and to cause halogenation at carbon atom four of the steroid nucleus and separating the 4-halo-21-acyloxy-17-hydroxypregnane-3,11,20-trione thus-produced.

ARTHUR R. HANZE.
ROBERT H. LEVIN.

No references cited.